United States Patent
Frichot et al.

(10) Patent No.: US 12,180,940 B2
(45) Date of Patent: Dec. 31, 2024

(54) METHOD OF OBTAINING DATA

(71) Applicant: VESTAS WIND SYSTEMS A/S, Aarhus N. (DK)

(72) Inventors: Tommy Frichot, Beder (DK); Anders Kjeldgaard Olesen, Viby J (DK); Morten Tim Thorsen, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 308 days.

(21) Appl. No.: 17/787,515

(22) PCT Filed: Dec. 16, 2020

(86) PCT No.: PCT/DK2020/050368
§ 371 (c)(1),
(2) Date: Jun. 20, 2022

(87) PCT Pub. No.: WO2021/121508
PCT Pub. Date: Jun. 24, 2021

(65) Prior Publication Data
US 2022/0381223 A1    Dec. 1, 2022

(30) Foreign Application Priority Data
Dec. 20, 2019 (DK) .......................... PA 2019 70831

(51) Int. Cl.
*F03D 7/04* (2006.01)
*F03D 17/00* (2016.01)
*G06Q 50/06* (2024.01)

(52) U.S. Cl.
CPC ............. *F03D 7/047* (2013.01); *F03D 17/00* (2016.05); *G06Q 50/06* (2013.01)

(58) Field of Classification Search
CPC ................................. F03D 7/047; F03D 17/00
See application file for complete search history.

(56) References Cited

U.S. PATENT DOCUMENTS

2004/0230377 A1    11/2004   Ghosh et al.
2018/0218060 A1    8/2018    Guron et al.
(Continued)

FOREIGN PATENT DOCUMENTS

EP    1690390 A1    8/2006
EP    3012449 A1    4/2016
(Continued)

OTHER PUBLICATIONS

Danish Patent and Trademark Office, 1st Technical Examination Including the Search Report and Search Opinion for Application PA2019 70831 dated May 19, 2020.
(Continued)

*Primary Examiner* — Courtney D Heinle
*Assistant Examiner* — John S Hunter, Jr.
(74) *Attorney, Agent, or Firm* — Patterson + Sheridan, LLP (57) ABSTRACT

The present disclosure provides a method for obtaining site data from a power plant within a private network of the power plant, where the power plant comprises one or more wind turbine generators. The method comprises a step of providing at an internal computer system placed internally with respect to the private network site data relating to the power plant, where the site data is in a site data format. The site date is stored in the internal computer system, and pushes to an external data interface outside the private network. The site data is transformed to a universal data format being different from the site data format before or after pushing the site data.

20 Claims, 3 Drawing Sheets

(56) References Cited

U.S. PATENT DOCUMENTS

2018/0262502 A1 9/2018 Frank et al.
2018/0287886 A1 10/2018 Kv et al.

FOREIGN PATENT DOCUMENTS

| WO | 2015023613 A1 | 2/2015 |
| WO | 2017117348 A1 | 7/2017 |
| WO | 2019025949 A1 | 2/2019 |
| WO | 2021121508 A1 | 6/2021 |

OTHER PUBLICATIONS

PCT, Notification of Transmittal of the International Search Report and the Written Opinion of the International Searching Authority, or the Declaration for Application PCT/DK2020/050368 dated Mar. 3, 2021.

METHOD OF OBTAINING DATA

INTRODUCTION

The disclosure relates to a method of obtaining data from a private network, and more particularly to a method of transforming said data and sending the transformed data to a storage device outside the private network.

BACKGROUND

Wind turbines normally have different control systems which differ for different types of turbine. For surveillance, control and/or operation data may be collected for different types for turbines. Safety and avoidance of hacking is an important issue.

SUMMARY

It is an object of embodiments of the disclosure to provide an improved method of obtaining data.

In a first aspect, the disclosure provides a method for obtaining site data from a power plant within a private network of the power plant, wherein the power plant comprises one or more wind turbine generators, and wherein the method comprises:

providing at an internal computer system placed internally with respect to the private network site data relating to the power plant, wherein the site data is in a site data format, storing the site date in the internal computer system, pushing the site data to an external data interface outside the private network, and transforming the site data to a universal data format being different from the site data format before or after pushing the site data.

The site data relating to the power plant may be at least one of power plant operation data, power plant conditions, weather conditions, and alarms, where power plant operation data may be parameter relevant for operation, of the power plant, such as for operation of the one or more wind turbine generators. Power plant conditions may include power production of the plant, power production of the wind turbine(s), measurements from load sensors of the wind turbine(s), etc. Weather conditions may as an example include measured wind speed and measured wind direction. Some of the parameters may be controllable, for example 'pitch angle' (for a wind turbine with controllable pitch angle), whereas others may be given (i.e., be uncontrollable) under certain circumstances, for example 'wind speed'. Some operational parameters may be qualitative (e.g., wind turbine shut down [yes/no]) or qualitative (e.g., rotor speed [rounds per minute (RPM)]).

For a wind turbine of a given type, such as a given brand, the site data may be in a specific format which may be specific to the given site and/or the specific type of wind turbine. The site date provided at the internal computer system placed internally with respect to the private network is in a site data format.

By transforming the site data to a universal data format, the specific site data relating to a specific power plant comprising one or more wind turbines, may be stored and/or processed in an external computer system outside the private network. The external computer system may receive site data from a plurality of private networks. As these private networks may comprise different types of power plants with site data in different site date formats, surveillance and/or processing of the site data may be facilitated by transforming the site data in the site data format to a universal data format.

'Private network' is understood as is common in the art and particularly as a network wherein restrictions are established to promote a secured environment, such wherein devices outside the private network cannot access it except via a selected strict subset of devices. A private network is understood to inherently comprise a plurality of devices (such as processors, computers, servers and/or clients) which are connected to each other in the private network.

'Power plant' is understood as is common in the art, and in particular as an entity capable of producing power, such as capable of (rated for) a production of at least 0.1 megawatt (MW), such as at least 1.0 MW, such as at least 10 MW. The power plant comprises one or more wind turbine generators (wherein a wind turbine generator may be abbreviated 'WTG' and is used interchangeably with 'wind turbine' which is generally known in the art), such as one or more horizontal axis wind turbines optionally each rated for at least 0.1 MW, and may in that case be referred to as wind power plant (WPP), and in case of the wind power plant comprising a plurality of wind turbines, it may be referred to as wind farm or wind park.

The site data is pushed to an external data interface outside the private network. By pushing the site data, communication of between the internal computer system and the external data interface is carried out on the initiative of the internal computer system. Consequently, the data safety in increased while the risk of hacking and unwanted access to the power plant in the private network is considerably reduced.

The universal data format may as an example have fully open specifications. The site format may be a proprietary format; i.e. a format which is specific for a given power plant, or even specific for a given wind turbine type of the giver power plant.

A data interface may be located in the private network, and wherein the step of transforming is carried out internal in the private network before pushing the site data. The internally located data interface may be configured to transform site data in a site data format specific for the specific private network.

The internally located data interface may form part of the power plant and may in a particular embodiment be form part of the internal computer system placed internally with respect to the private network.

Alternatively, the site date in the site data format may be pushed to an external data interface and subsequently transformed to the universal data format The external data interface located outside the private network may form part of a separate external computer system which may be responsible for transforming the site data in the site data format to the universal data format or may alternatively form part of an external computer system which as an example may be used for surveillance of one or more power plant and/or used processing of the site data in the universal data format.

If site data is transformed to a universal data format in the private network, the site data in the universal data format may be pushed directly to an external data interface outside the private network, where the external data interface in one example may be in direct communication with or may form part of an external computer system e.g. for surveillance of one or more power plant and/or for processing of the site data in the universal data format.

The external computer system may be encompassed in a private network of an external data centre. The private network of the external data centre may be denoted a second private network. The external data centre may be as an example be a data centre for surveillance and/or service of at least one power plant. In one embodiment, the data centre may be configured for surveillance and/or service of a plurality power plant, such a wind turbine parks comprising one or more wind turbines.

In an example, the storing in the internal computer system is done in a queue whereby is understood that the site data are stored in a sequence determining the sequence in which they are handled. For example, the sequence of the site data in the queue determines the sequences in which the site date in the site data format are pushed to the external data interface and optionally the sequence in which they are handled. In addition or alternatively, storing in a queue can be done such that the site data are stored in the order in which they are provided and can therefore be handled according to the First In First Out (FIFO) principle.

In one embodiment, storing of site data may trigger at least one of pushing and transforming. Alternatively, pushing and/or transforming may be performed in accordance with a predetermined time schedule. In a further alternative, pushing and/or transforming may be performed based on the number of site data stored, e.g. in combination with the use of a time schedule. The latter may ensure that site data is not stored in a time period exceeding a predetermined length.

Furthermore, the type of site data may trigger at least one of pushing and transforming. This may be of particularly relevant, if the site data contains data relating to e.g. alarms and/or faults.

The above criteria for pushing and/or transforming may be applied in different combinations, e.g. in dependency of the type of power plant, the size of the power plant, the number and/or size of the wind turbine(s), the type wind turbine(s), the type of site data, etc.

The method may further comprise a step of pushing site data in the universal data format from a second site to the to the external data interface. The site data may before transformation to the universal data format be of a format being different from the first site data. In one embodiment, the site data in the site data format may be of the same site data format as the first site data.

The method may comprise steps of pushing site data in the universal data format from a plurality of internal computer systems placed internally in a plurality of private networks to the external data interface. The site data from the plurality of internal computer system may all be in different site data formats before the transformation. However, at least two of the site data in the site data format may apply identical site data formats.

In one embodiment, at least one set of site data may be transformed to the universal data format before pushing the site data to the external data interface, whereas in an alternative embodiment all sets of site data may be transformed to the universal data format before pushing the site data to the external data interface. In a further alternative, all sets of site data may be pushed to the external data interface before transforming the site data to the universal data format.

The method may further comprise a step of pushing site data in the universal data format from the external data interface to an external computer system outside the private network. The external data interface may transform the site data in the site data format to the universal data format or may receive the site date in the universal data format. If the external data interface receives the site data in the universal data interface, the external data interface may be configured for sorting the site data in the universal data format and/or configured for preparing the site data in the universal data format for processing in the external computer system outside the private network.

The external computer system may use a specific data format being different from the universal data format. To facilitate sorting of data and/or surveillance of the power plant within the private network, the method may in one embodiment further comprise a step of transforming the site data in the universal data format into a specific data format used by the external computer system by the external data interface. The step of transforming the site data in the universal may comprise a step of selecting only parts of the site data in the universal format and transforming only the selected part into the specific data format.

The method may comprise a step of verifying the site data in the universal data format by the external computer system. The verification step may include checking whether the site data in the universal data format is in the right format and not corrupted or tampered. The verification step may additionally or alternatively include checking whether the site data is pushed from the internal computer in the private network; i.e. that the sender of the site data is actually the sender which is said to be the sender to thereby check whether hacking has occurred.

Additionally, the site data may comprise data which may be used for surveillance of the power plant of the private network. The site data received may be checked to thereby identify differences between received site data and stored date in the external computer system, to identify faults, to identify alarms, etc. A fault may as an example be detected by comparing site data relating to production and wind speed with stored data relating to expected production at a given wind speed. If the site data relating to production deviates from the expected production at the given wind speed, the wind turbine in question may have one or more components with faults or with incorrect settings.

Additionally, the method may comprise a step of preparing commands, set-points and/or recommendations for the power plant based on the site data. In one embodiment, the step of preparing commands, set-points and/or recommendations for the power plant may be based on the verification of the site data in the universal data format. In another embodiment, the step of preparing commands, set-points and/or recommendations may be based on the site data in the specific data format. As an example, a command or recommendation may be to stop a specific wind turbine if a serious fault is detected. Another exemplary command or recommendation may be to increase recording of data for a specific component to increase surveillance of this specific component. A further example of a command, is a request for resending site data, e.g. if the site data pushed to the external data interface does not pass a verification test. An example of a set-point could be an active power or reactive set-point to be complied with by the power plant or by a specific wind turbine generator. A failure to pass the verification test could be due to corrupted data, e.g. due to a failure during the transfer of the data or due to hacking attempts.

To minimise the risk of unwanted access to the power plant within the private network, the method may comprise a step where the internal computer system requests the prepared commands from the external computer system. I.e. the external computer system may prepare the commands, but cannot push these commands to the internal computer system. Instead the internal computer system may request the commands.

The method may comprise a step wherein the internal computer system requests commands from the external computer system in accordance with a predetermined time schedule, such as every 10 seconds, such as every second.

The site data pushed to the external data interface may be registered data being averaged over a certain time period.

The method may further comprise a step of amending the predetermined time schedule. This may be done in dependency of the site data pushed to the external data interface, such as based on faults determined by the external computer system.

The external data interface may be encompassed in a second private network of an external data centre. In one embodiment, the external data interface and the external computer system may both be encompassed in the second private network, where the second private network is different from the private network of the power plant which may be denoted a first private network. An additional power plant comprising one or more wind turbine generators may be located in an additional private network which as an example may be denoted a third private network. It should be understood that the numbering may differ and does not imply any limitation to the disclosure.

The site data in the universal data format may be pushed from the private network of the power plant to the external data interface at least partly via a public network. As an alternative, the site data may be pushed via a VPN or partly private network.

The method may comprise a step where the external computer system requests the internal computer system to request prepared commands. In this embodiment, the external computer system may forward a request to the internal computer system, but can still not push the commands to the internal computer system. When the request has been forwarded to the internal computer system, the internal computer system itself fetches the commands from the external computer system to thereby ensure that no commands are pushed to the internal computer.

In a second aspect, the disclosure provides a system comprising:
    a power plant comprising:
        one or more wind turbine generators, and
        a private network,
    an internal computer system placed internally within the private network, and
    an external data interface arranged outside the private network,
wherein the system is arranged for carrying out a method according to the first aspect.

In a third aspect, the disclosure provides a computer program product comprising instructions to cause a system according to the second aspect to execute the steps of a method according to the third aspect.

The first, second, and third aspect of the present disclosure may each be combined with any of the other aspects. These and other aspects of the invention will be apparent from and elucidated with reference to the embodiments described hereinafter.

BRIEF DESCRIPTION OF THE FIGURES

The method for obtaining site data from a power plant within a private network of a power plant and the corresponding system and computer program product according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

It should be understood that the detailed description is given by way of illustration only, since various changes and modifications within the spirit and scope of the disclosure will become apparent to those skilled in the art from this detailed description.

Figure 1:
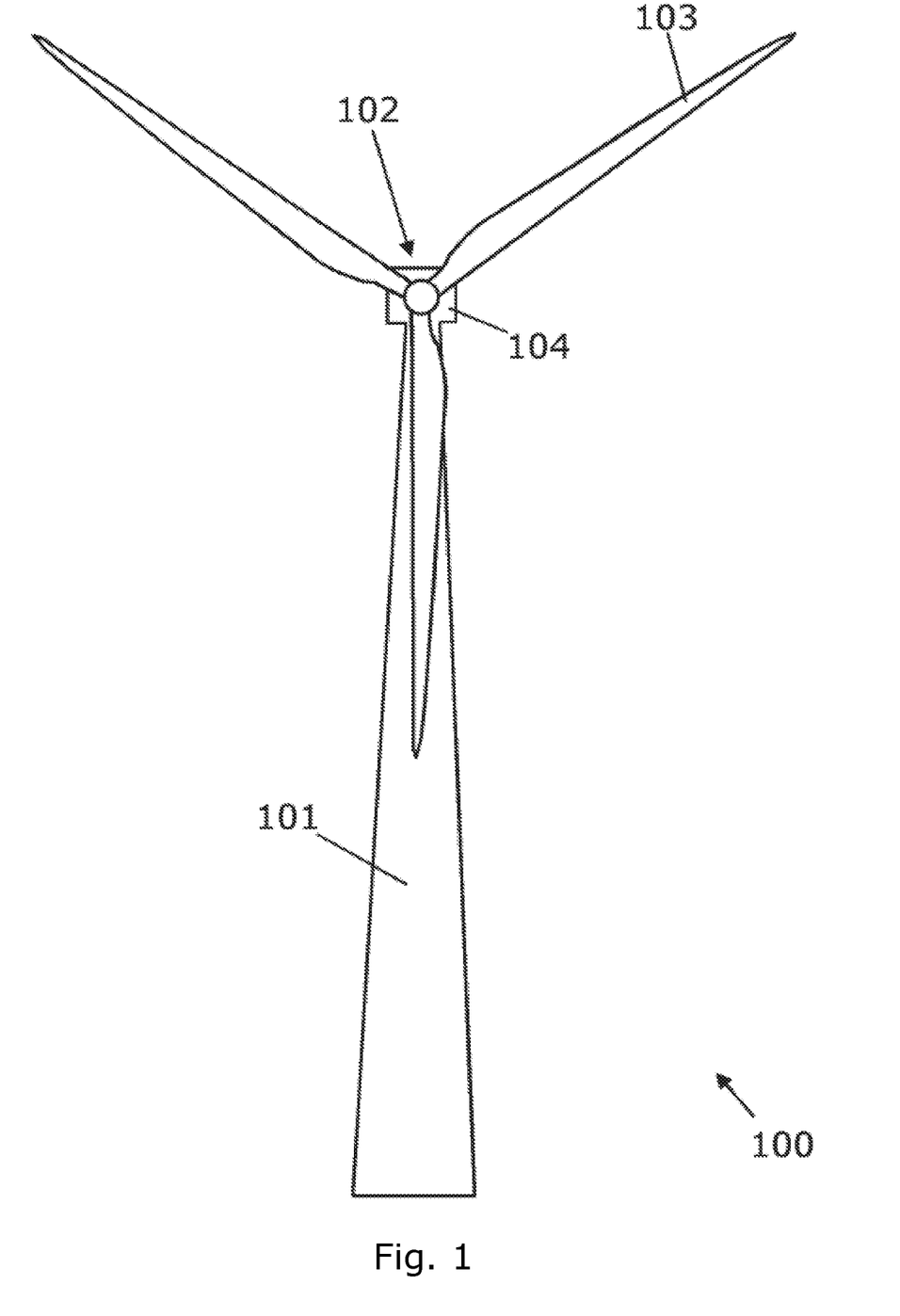
FIG. 1 illustrates a wind turbine.

FIG. 1 shows a wind turbine 100 (which may also be referred to as a wind turbine generator (WTG)) comprising a tower 101 and a rotor 102 with at least one rotor blade 103, such as three blades. The rotor is connected to a nacelle 104 which is mounted on top of the tower 101 and being adapted to drive a generator situated inside the nacelle. The rotor 102 is rotatable by action of the wind. The wind induced rotational energy of the rotor blades 103 is transferred via a shaft to an electrical generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request. The blades 103 can be pitched in order to alter the aerodynamic properties of the blades, e.g. in order to maximize uptake of the wind energy and to ensure that the rotor blades are not subjected to too large loads when strong winds are blowing. The blades are pitched by a pitch system with a pitch force system controlled by a pitch control system, where the pitch force system includes actuators for pitching the blades dependent on a pitch request from the pitch control system. The wind turbine may be an asset of a (wind) power plant and the parts of the wind turbine, such as one or more of the actuators for pitching the blades, may similarly be seen as (sub-)assets of the wind turbine and power plant.

Figure 2:
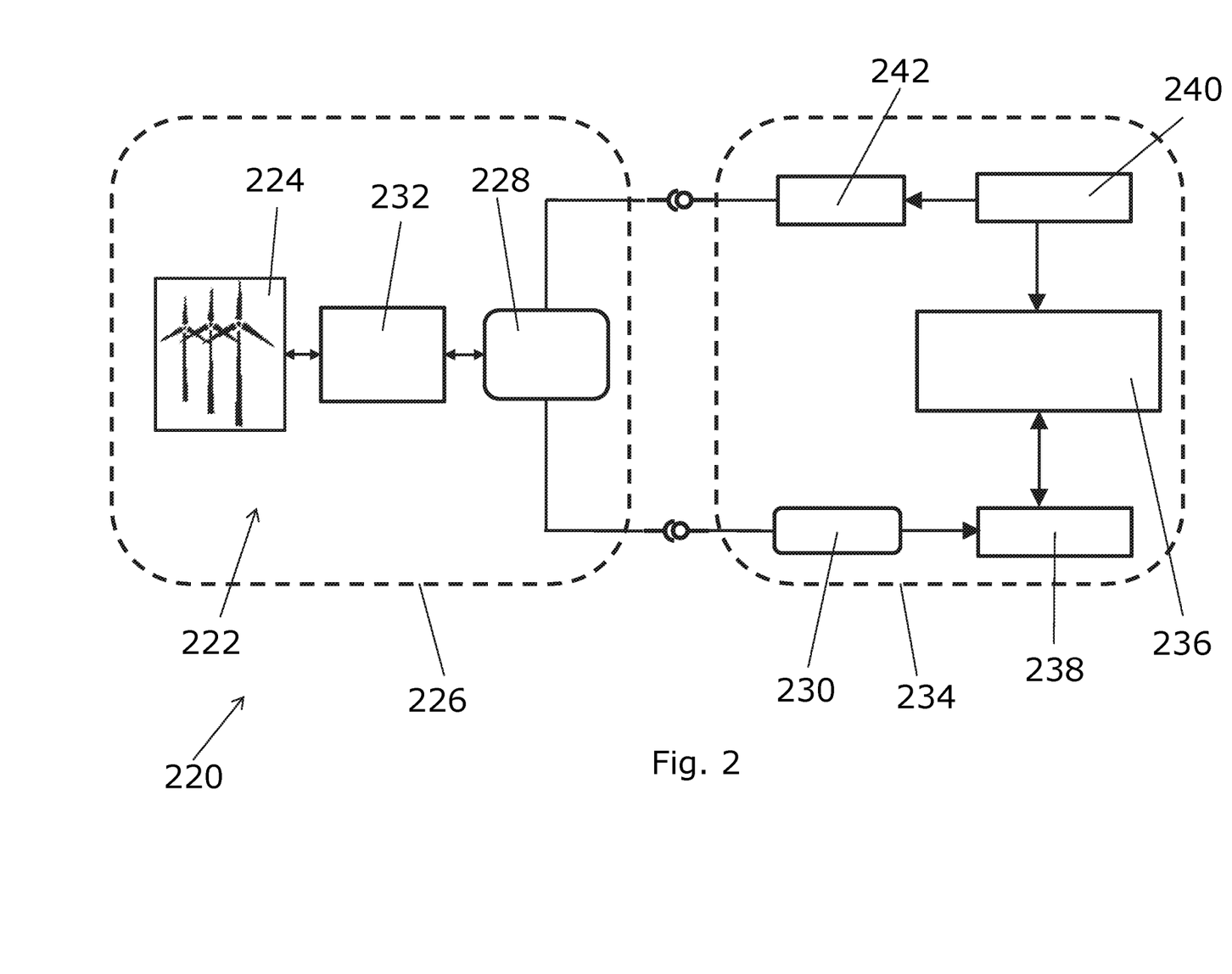
FIG. 2 illustrates an embodiment of a system according to an aspect of the disclosure.

FIG. 2 illustrates a system 220 comprising a power plant 222, where the power plant 222 comprises one or more wind turbine generators 224, and a private network 226. The system 222 further comprises an internal computer system 228 placed internally within the private network, and an external data interface 230 arranged outside the private network 226. The system 220 is arranged for carrying out a method 350 for obtaining site data from the power plant 222 within the private network 226 of the power plant 222.

The site data comprises at least one of power plant operation data, power plant conditions, weather conditions, and alarms, where power plant operation data may be parameter relevant for operation, of the power plant, such as for operation of the one or more wind turbine generators. Power plant conditions may include power production of the plant, power production of the wind turbine(s), measurements from load sensors of the wind turbine(s), etc. Weather conditions may as an example include measured wind speed and measured wind direction. Site data in a site data format is stored in an internal database 232 internally in the private network 226.

In addition to wind turbine generators 224, the power plant 222 may comprise solar panels (with Photovoltaic cells), energy storage systems and/or met masts which may generate site data to be stored in the internal database 232.

In the illustrated embodiment, the site data in the site data format is transformed to a universal data format being different from the site data format by a data interface associated with the internal computer system 228.

The site date in the universal data format is pushed from the internal computer 228 to an external data interface 230 outside the private network. In the illustrated embodiment, the external data interface 230 is located within a second private network 234.

The site data is pushed from the external data interface 230 to an external computer system 236 outside the private network. The external computer system 236 is located within the second private network 234. The site data in the universal data format may by the external data interface 230 be transformed into a specific data format used by the external computer system 236 before pushing the site data from the external data interface 230 to the external computer system 236. The external data interface 230 may verify the received site data. The verification may include checking if the site data is received from a known site and relates to known wind turbines.

In the illustrated embodiment, the second private network 234 comprises an intermediate digital data storage 238 for temporary storage of the site data. In one embodiment, the site data may be stored in the intermediate digital data storage 238 before being push to different computers of the external computer system 236, e.g. by pushing one type of site data to one computer and another type of site data to another computer. In an alternative embodiment, the site data is push directly to the external computer system 236.

The external computer system 236 may verify the site data in the universal data format or in the specific data format. The verification may include checking whether the site data is in the correct format and not corrupted or tampered. The verification may additionally or alternatively include checking whether the site data is pushed from the internal computer 228 in the private network 226. It is to be understood that the verification of the site data may be performed by the external data interface 230 and/or the external computer system 236. In one example, the external data interface 230 validates that the site data is received from a trusted source and the external computer system 236 verifies that the data itself is corrupted, e.g. not readable, or there is doubt that the site data is correct. If the external computer system 236 finds that the site data is corrupted, it may prepare a command for the power plant 222 to resent the specific site data.

Additionally, the external computer system 236 comprises data which can be used for surveillance of the power plant 222 of the private network 226.

Additionally, the external computer system 236 prepares commands for the power plant 222 based on the site data.

To minimise the risk of unwanted access to the power plant 222 within the private network 226, the internal computer system 228 requests the prepared commands from the external computer system 236. Thus, the external computer system 236 prepares the commands, but cannot push these commands to the internal computer system 228.

The prepared commands are temporary stored in a request and command queue 240 until they are requested by the internal computer system 228.

In the illustrated embodiment, the system further comprises an evaluation centre 242. In the evaluation centre 242 the commands prepared are evaluated before being released and thereby requestable for the internal computer system 228 within the private network of the power plant 222. When evaluated and released, the commands can be forwarded to the power plant 222 upon request from the internal computer system 228.

The commands prepared by the external computer system 236 and requested by the internal computer system 228 is subsequently transferred to the power plant 222 and implemented in the wind turbines 224.

Figure 3:
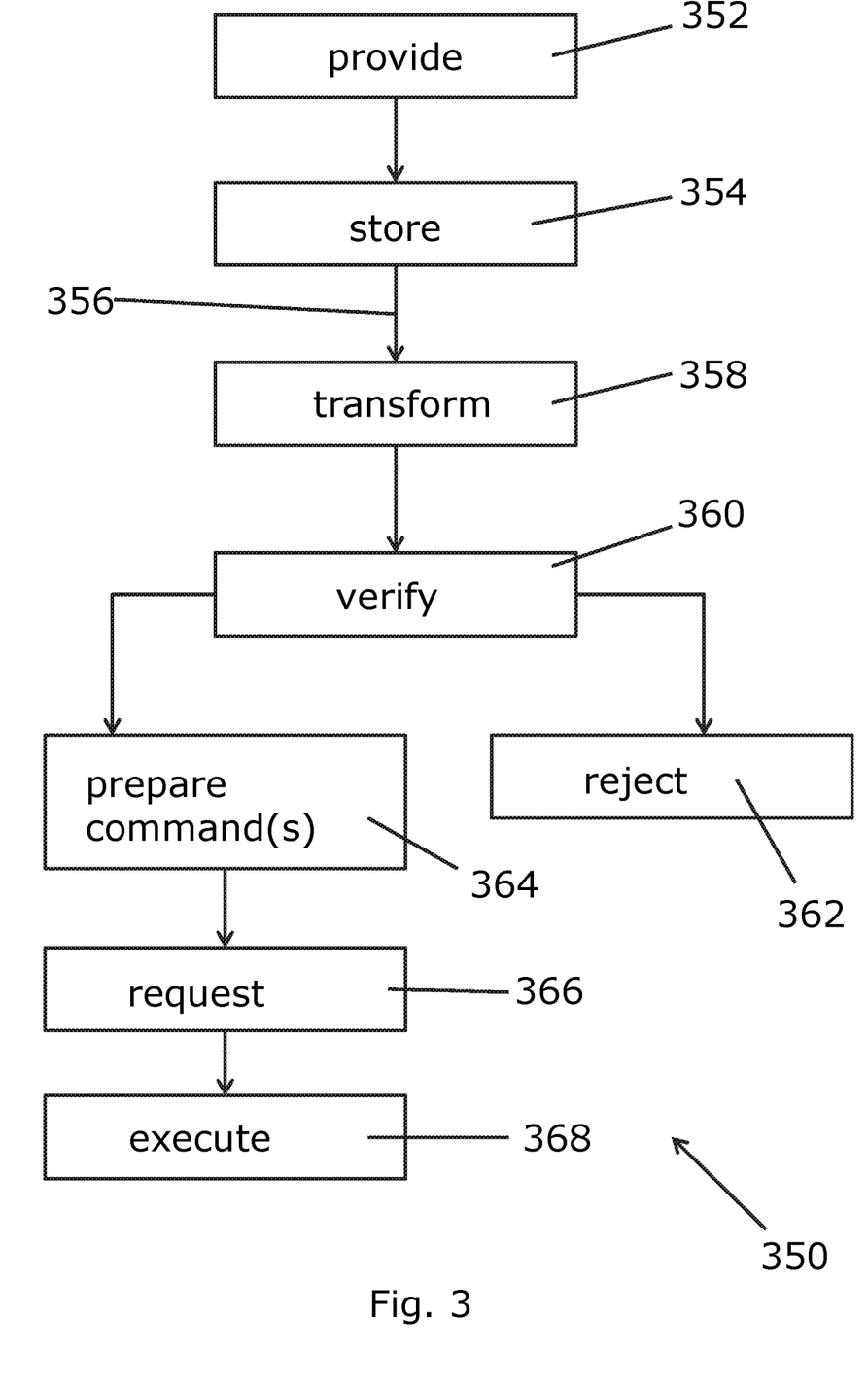
FIG. 3 is a flow chart illustrating a method for obtaining site date from a power plant within a private network.

FIG. 3 is a flow chart illustrating a method 350 for obtaining site data from a power plant 222 within a private network 226 of the power plant, wherein the power plant 222 comprises one or more wind turbine generators 224, and wherein the method 350 comprises:

providing 352 at an internal computer system 228 placed internally with respect to the private network 26 site data relating to the power plant 222, wherein the site data is in a site data format, storing 354 the site date in the internal computer system 228, pushing 356 the site data to an external data interface 230 outside the private network 226, and transforming 358 the site data to a universal data format being different from the site data format before or after pushing the site data.

The site data is pushed from the external data interface 230 to an external computer system 236 outside the private network. The external computer system 236 verifies 360 the site data in the universal data format or in the specific data format. The verification may include checking whether the site data is in the correct format and not corrupted or tampered. The verification may additionally or alternatively include checking whether the site data is pushed from the internal computer 228 in the private network 226.

If the site data cannot be verified, the site data is rejected 362.

If the site data can be verified, the external computer system 236 may prepare commands 364 for the power plant 222 based on the site data.

To minimise the risk of unwanted access to the power plant 222 within the private network 226, the internal computer system 228 requests 366 the prepared commands from the external computer system 236.

The commands prepared by the external computer system 236 and requested by the internal computer system 228 is subsequently transferred to the power plant 222 and executed 368 in the wind turbines 224.

Although the present disclosure has been described in connection with the specified embodiments, it should not be construed as being in any way limited to the presented examples. The scope of the present disclosure is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the disclosure. Furthermore, individual features mentioned in different claims, may possibly be advantageously combined, and the mentioning of these features in different claims does not exclude that a combination of features is not possible and advantageous.

The invention claimed is:

1. A method for obtaining site data from a power plant within a private network of the power plant, wherein the power plant comprises one or more wind turbine generators, and wherein the method comprises:
   providing, at an internal computer system placed internally with respect to the private network, site data relating to the power plant, wherein the site data is in a site data format;
   storing the site date in the internal computer system;
   pushing the site data to an external data interface outside the private network;
   transforming the site data to a universal data format being different from the site data format before or after pushing the site data, wherein a plurality of commands for the power plant are generated by an external computer system based on the site data and stored in a queue;
   sending a request, by the internal computer system to the external computer system, to request a command from the plurality of commands stored in the queue;
   receiving the command, by the internal computer system from the external computer system; and
   executing the received command, by the internal computer system, on the one or more wind turbine generators.

2. The method of claim 1, wherein a data interface is located in the private network, and wherein the step of transforming is carried out internal in the private network before pushing the site data.

3. The method of claim 1, wherein storing of site data triggers at least one of pushing and transforming.

4. The method of claim 1, further comprising a step of pushing site data in the universal data format from a second site to the external data interface.

5. The method of claim 1, further comprising a step of pushing site data in the universal data format from the external data interface to the external computer system outside the private network.

6. The method of claim 1, wherein the external computer system verifies that the site data is in the universal data format.

7. The method of claim 1, wherein the external data interface is encompassed in a second private network of an external data centre.

8. The method of claim 1, wherein the site data in the universal data format is pushed from the private network of the power plant to the external data interface at least partly via a public network.

9. The method of claim 1, wherein the site data comprises at least one of power plant operation data, power plant conditions, weather conditions, and alarms.

10. The method of claim 1, further comprising a step of transforming the site data in the universal data format into a specific data format used by the external computer system by the external data interface.

11. The method of claim 1, wherein the external computer system verifies that the site data is in a complete format free of corrupted data.

12. The method of claim 1, wherein the external computer system verifies that the site data is pushed from the internal computer system within the private network.

13. The method of claim 1, wherein the external computer system rejects the site data upon determine at least one of:
   the site data is not in a format compatible with the external computer system,
   the site data is not in a complete format free of corrupted data, or
   the site data is not from the internal computer system within the private network.

14. The method of claim 1, wherein the command is evaluated by the external computer system to confirm validity before being forwarded to the internal computer system.

15. The method of claim 1, wherein executing the received command, by the internal computer system, on the one or more wind turbine generators comprises at least one of:
   stopping the one or more wind turbine generators upon detection of a fault, increasing a recording of data for the one or more wind turbine generators, or requesting a resend of the site data.

16. A system comprising:
   a power plant comprising:
      one or more wind turbine generators; and
      a private network;
   an internal computer system placed internally within the private network; and
   an external data interface arranged outside the private network;
   wherein the system is arranged to perform an operation for obtaining site data from a power plant within a private network of the power plant, wherein the power plant comprises one or more wind turbine generators, the operation comprising:
      providing, at an internal computer system placed internally with respect to the private network, site data relating to the power plant, wherein the site data is in a site data format;
      storing the site date in the internal computer system;
      pushing the site data to an external data interface outside the private network;
      transforming the site data to a universal data format being different from the site data format before or after pushing the site data, wherein a plurality of commands for the power plant are generated by an external computer system based on the site data and stored in a queue;
      sending a request, by the internal computer system to the external computer system, to request a command from the plurality of commands stored in the queue;
      receiving the command, by the internal computer system from the external computer system; and
      executing the received command, by the internal computer system, on the one or more wind turbine generators.

17. The system of claim 16, wherein the operation further comprise pushing site data in the universal data format from a second site to the external data interface.

18. The system of claim 16, wherein the command is evaluated by the external computer system to confirm validity before being forwarded to the internal computer system.

19. The system of claim 16, wherein executing the received command, by the internal computer system, on the one or more wind turbine generators comprises at least one of:
   stopping the one or more wind turbine generators upon detection of a fault, increasing a recording of data for the one or more wind turbine generators, or requesting a resend of the site data.

20. A non-transitory computer program product comprising instructions to cause a system to perform an operation for obtaining site data from a power plant within a private network of the power plant, wherein the power plant comprises one or more wind turbine generators, the operation comprising:
- providing, at an internal computer system placed internally with respect to the private network, site data relating to the power plant, wherein the site data is in a site data format;
- storing the site date in the internal computer system;
- pushing the site data to an external data interface outside the private network;
- transforming the site data to a universal data format being different from the site data format before or after pushing the site data, wherein a plurality of commands for the power plant are generated by an external computer system based on the site data and stored in a queue;
- sending a request, by the internal computer system to the external computer system, to request a command from the plurality of commands stored in the queue;
- receiving the command, by the internal computer system from the external computer system; and
- executing the received command, by the internal computer system, on the one or more wind turbine generators.

* * * * *